United States Patent Office 3,157,881
Patented Nov. 17, 1964

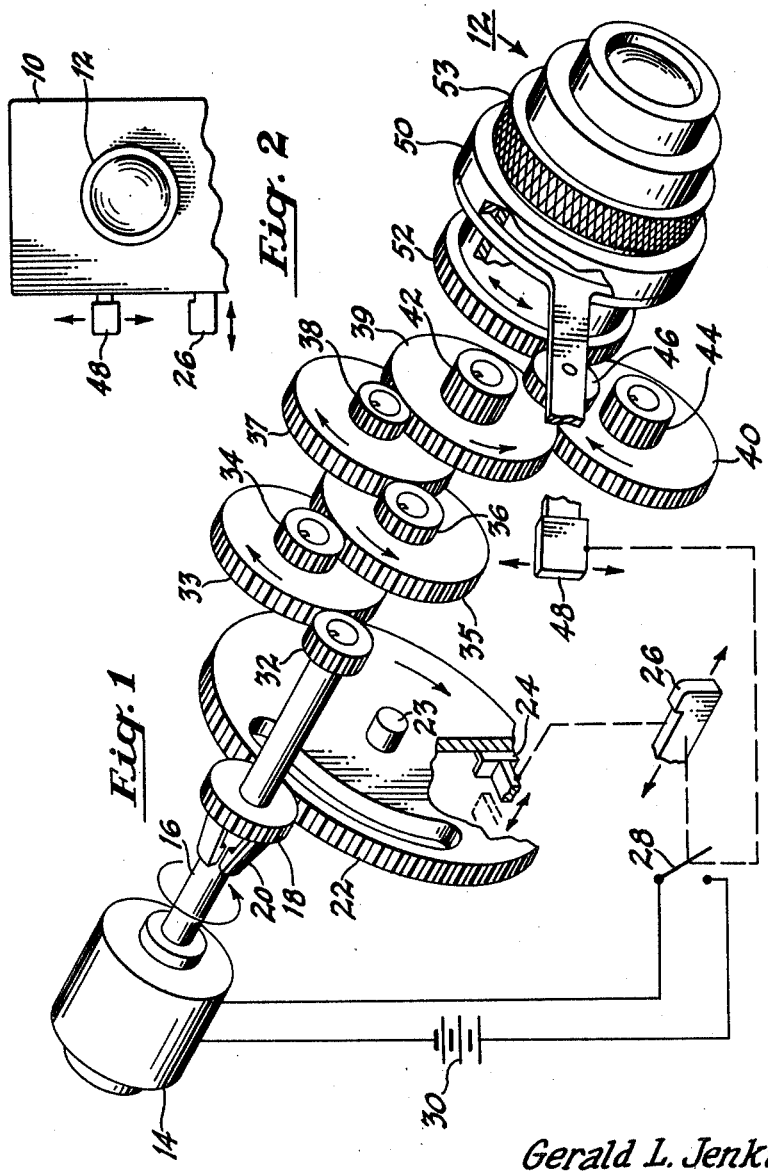

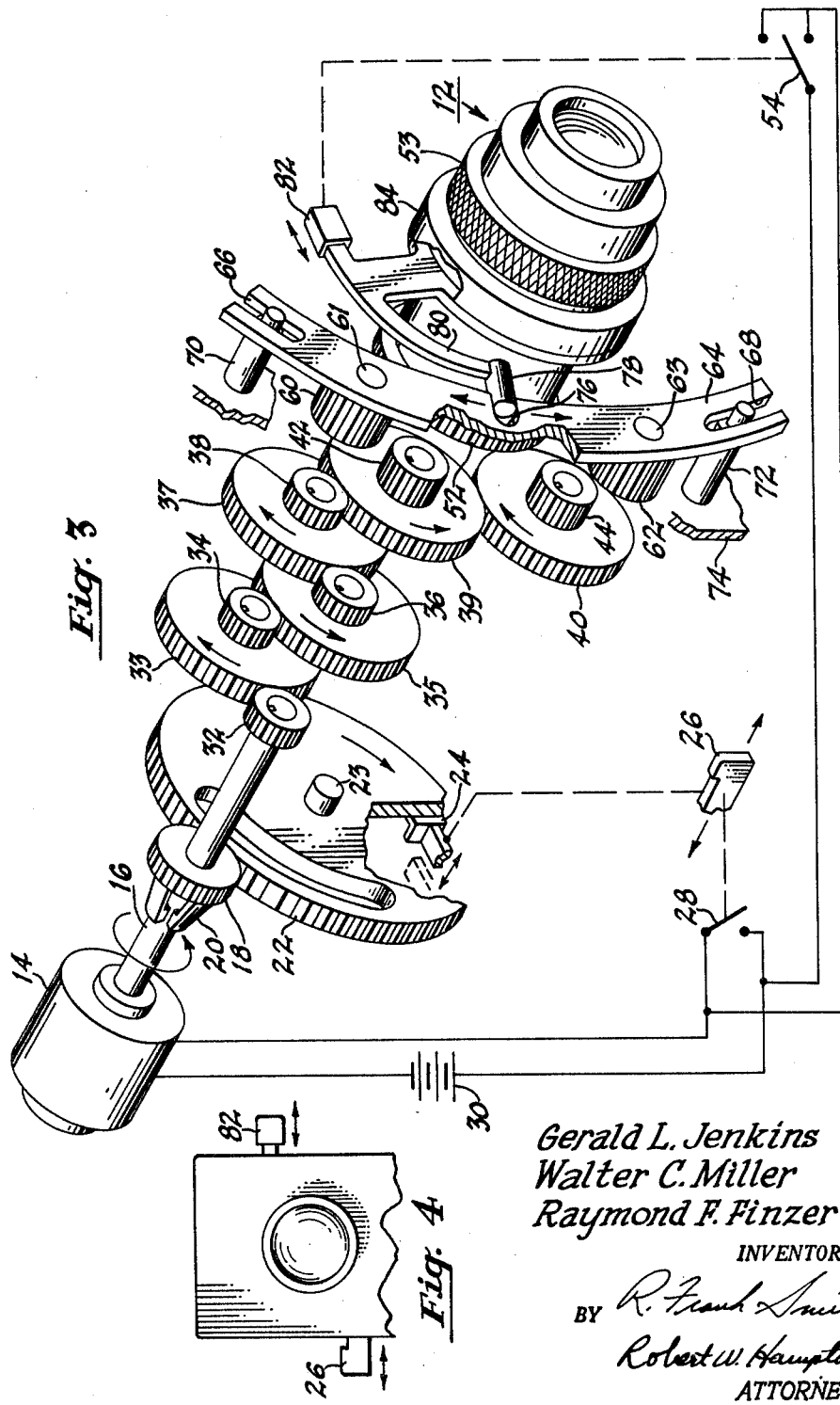

3,157,881
ZOOM LENS DRIVE MECHANISMS FOR PHOTOGRAPHIC CAMERAS
Gerald L. Jenkins, Walter C. Miller, and Raymond F. Finzer, all of Rochester, N.Y., assignors to Eastman Kodak Company, Rochester, N.Y., a corporation of New Jersey
Filed July 6, 1961, Ser. No. 122,287
5 Claims. (Cl. 352—166)

The present invention relates to photographic cameras having zoom, or pancratic lenses and more particularly concerns means for adjusting the zoom lens with power supplied from a camera motor.

It is a primary object of the invention to couple the shutter drive motor of a camera to a zoom drive mechanism in either a forward or a reverse direction.

Another object of the invention is to energize an electric drive motor of a camera either under control of a shutter actuating member or under control of a zoom control member.

Another object of the invention is to couple the output of a reduction gear train, which is connected to an electric drive motor for a camera, to the drive gear for a zoom lens system, either in a forward or in a reverse direction.

Other objects of the invention will appear from the following description, reference being made to the accompanying drawings, wherein:

FIG. 1 is an exploded isometric view of the power zoom and shutter drive mechanisms and circuit;

FIG. 2 is a partial front view of a camera showing the zoom control and shutter actuating members;

FIG. 3 is a view similar to FIG. 1 illustrating an alternate embodiment of the invention; and FIG. 4 is a partial front view of a camera illustrating the positions of the shutter actuating and zoom control members in the embodiment of FIG. 3.

Referring to FIGS. 1 and 2, a camera embodying the present invention has a cover 10 and a zoom lens system 12, for example of the type disclosed in U.S. Patent 1,988,390, wherein a rotatable input gear or other member 52 adjusts the magnification of the zoom lens within a predetermined range of magnifications. A camera drive motor, illustrated as an electric motor, has an output shaft 16 driving a pinion 18 through a friction slip clutch 20. Pinion 18 engages the toothed periphery of a shutter member 22, which is rotatably mounted on a shaft 23. A brake member 24 normally engages a surface of shutter member 22 with sufficient force to overcome the friction of clutch 20 and thereby prevent the shutter member 22 from rotating.

A shutter actuating member 26 is coupled to brake member 24, as illustrated schematically in FIG. 1, and upon manual movement thereof toward the camera body, releases the brake member from its frictional engagement with member 22, thereby permitting the latter to be rotated by pinion 18. The movement of member 26 toward the camera body also closes a switch 28, which is coupled thereto as illustrated schematically in FIG. 1, thereby operating the motor by completing a series circuit including motor 14, switch 28 and a power source 30, which is illustrated as a battery.

A second pinion 32 is keyed to shaft 16 for rotation therewith and constitutes the input to a power transmission means comprising a speed-reduction train of gears 33, 34, 35, 36, 37, 38 and 39. Gear 39 meshes with and drives another gear 40 of approximately the same diameter. Each gear 39 and 40 has secured thereto a respective smaller gear 42 and 44, constituting oppositely rotating output members from the transmission means. A coupling gear 46 is mounted on a zoom control member 48, which extends through the camera cover and is manually movable up or down (as viewed in FIGS. 1 and 2) for engaging gear 46 with either gear 42 or 44, and thereby driving gear 46 in either of two opposite directions. Gear 46 continuously engages the previously mentioned zoom input gear 52 for the zoom lens system and couples the output of the transmission means to gear 52. The zoom control member 48 is mounted on a sleeve 50, which is freely rotatable about the barrel of the zoom lens 12. Member 48 has a neutral position, as shown in FIG. 1, wherein the coupling gear 46 is disengaged from both gears 42 and 44. When the zoom control member 48 is in its neutral position, the zoom lens 12 may be adjusted manually by a knurled ring 53, which is integral with the zoom input gear 52. It will be obvious that friction rollers or other drive members may be substituted for any of the above gears, primarily gears 42, 44, 46 and 52.

Referring to FIGS. 3 and 4, a second embodiment of the invention comprises a motor 14, a shutter drive mechanism and a speed reduction power transmission identical to those shown in FIG. 1, including the oppositely rotating output members, or gears 42 and 44. A pair of coupling members, illustrated as gears 60 and 62, are rotatably mounted on respective shafts 61 and 63, which are supported by an arcuate member 64. The latter member is supported for arcuate movement by a pair of end slots 66 and 68, which are adapted to receive respective stud shafts 70 and 72, the latter being supported by a stationary frame member 74. A slot 76 in member 64 is adapted to receive a pin 78 mounted on an arm 80 of the zoom control member 82, which extends outside of the camera cover and is supported by a sleeve 84 rotatably mounted on the barrel of the zoom lens 12.

Movement of the zoom control member 82 to the right (as viewed in FIGS. 3 and 4) engages coupling gear 62 with output gear 44 and with the zoom drive gear 52, thereby adjusting the zoom lens in one direction. Movement of member 82 to the left engages gear 60 with output gear 42 and with gear 52, thereby adjusting the zoom lens in the other direction. In the neutral position of member 82, as shown in FIG. 3, neither gear 60 nor 62 engages its corresponding output gear 42 or 44, and the zoom lens may be adjusted manually by ring 53 as previously described. In the neutral position of member 82, a double-throw switch 54, parallel to switch 28 and coupled to member 82 as illustrated schematically in FIG. 3, engages neither of its two contacts; therefore it maintains the motor circuit open unless the camera actuating lever 26 is operated to close switch 28. When member 82 is moved to the right or to the left, switch 54 is closed to operate motor 14, regardless of the condition of switch 28.

The invention has been described in detail with particular reference to preferred embodiments thereof, but it will be understood that variations and modifications can be effected within the spirit and scope of the invention as described hereinabove and as defined in the appended claims.

We claim:
1. In a motion picture camera having a taking lens system including at least one zoom lens movable axially in either of two directions to adjust the magnification thereof, means including a rotatable input member for moving said zoom lens, a cyclically operable shutter, and an electric drive motor, the combination comprising:
   a normally open electric circuit operable, upon completion thereof, for supplying energy to said motor;
   a slip clutch coupling said motor to said shutter;
   brake means normally blocking operation of said shutter;
   manually operable means on said camera for releasing said brake means and for completing said circuit to energize said motor and enable operation of said shutter;

power transmission means coupled to said motor and having a pair of output members oppositely rotatable in response to energization of said motor; and control means manually operable in either of two directions for closing said circuit independently of said manually operable means to energize said motor and for coupling one of said oppositely rotatable members to said input member for adjusting said zoom lens in a corresponding direction.

2. In a motion picture camera having a taking lens system including at least one zoom lens movable axially in either of two directions to adjust the magnification thereof, means including a rotatable input member for moving said zoom lens, a cyclically operable shutter, and an electric motor, the combination comprising:

a normally open electric circuit operable, upon completion thereof; for supplying energy to said motor;
a slip clutch coupling said motor to said shutter;
brake means normally blocking operation of said shutter;
manually operable means on said camera for releasing said brake means and for completing said circuit to energize said motor and enable operation of said shutter;
power transmission means coupled to said motor and having a pair of output members oppositely rotatable in response to energization of said motor;
a zoom control member manually operable in either of two directions for closing said circuit independently of said manually operable means to energize said motor; and
a coupling member movable with said zoom control member and adapted, upon movement of said zoom control member in either direction, for coupling one of said oppositely rotatable members to said input member for adjusting said zoom lens in a corresponding direction.

3. A camera in accordance with claim 2 wherein said normally open circuit comprises a source of electrical energy and a single, normally open switch adapted to be closed in response to operation of either said manually operable means or said zoom control member.

4. A camera in accordance with claim 2 wherein said normally open circuit comprises a source of electrical energy and a pair of normally open switches in mutually parallel circuit relation and cooperating with said manually operable means and said zoom control member, respectively, each of said switches being closed in response to operation of the aforesaid member with which it cooperates.

5. In a motion picture camera having a taking lens system including at least one zoom lens movable axially in either of two directions to adjust the magnification thereof, means including a rotatable input gear for moving said zoom lens, a cyclically operable shutter, and an electric drive motor, the combination comprising:

a normally open circuit operable, upon completion thereof, for supplying energy to said motor;
a slip clutch coupling said motor to said shutter;
brake means normally blocking operation of said shutter;
manually operable means on said camera for releasing said brake means and for completing said circuit to energize said motor and enable operation of said shutter;
power transmission means coupled to said motor and having a pair of output gears oppositely rotatable in response to energization of said motor;
a zoom control member manually operable in either of two directions for closing said circuit independently of said manually operable means to energize said motor; and
coupling means operatively connected to said zoom control member and movable thereby, said coupling means including two spaced and freely rotatable gears, one of which is adapted to be positioned in driving engagement with one of said output gears and said input gear, upon movement of said zoom control member in one direction, and the other of which is adapted to be positioned in driving engagement with the other of said output gears and said input gear, upon movement of said zoom control member in the other direction, for adjusitng said zoom lens in corresponding directions.

References Cited in the file of this patent

UNITED STATES PATENTS

| | | |
|---|---|---|
| 1,271,929 | Nelson | July 9, 1918 |
| 2,969,006 | Gunther | Jan. 24, 1961 |
| 2,995,061 | Briskin et al. | Aug. 8, 1961 |